United States Patent [19]

Johnson et al.

[11] 4,449,068
[45] May 15, 1984

[54] SONAR COMPENSATION TRANSFORMER

[75] Inventors: Leopold J. Johnson, Valley Center; David L. Carson, San Diego, both of Calif.

[73] Assignee: The United States of America as represented by the Secretary of the Navy, Washington, D.C.

[21] Appl. No.: 534,901

[22] Filed: Sep. 22, 1983

[51] Int. Cl.³ .................................................. H01L 41/08
[52] U.S. Cl. ....................................... 310/316; 310/317
[58] Field of Search ............... 310/316, 317, 319, 314, 310/334; 367/135, 137, 903, 87

[56] References Cited

U.S. PATENT DOCUMENTS

| | | | |
|---|---|---|---|
| 2,849,075 | 8/1958 | Godbey | 310/316 X |
| 3,613,068 | 10/1971 | Thompson et al. | 340/3 R |
| 4,051,426 | 9/1977 | Wood | 310/317 X |
| 4,109,174 | 8/1978 | Hodgson | 310/316 |
| 4,181,864 | 1/1980 | Etzold | 310/316 X |
| 4,353,004 | 10/1982 | Kleinschmidt | 310/317 X |
| 4,357,690 | 11/1982 | Kuroda et al. | 310/317 X |

Primary Examiner—Mark O. Budd
Attorney, Agent, or Firm—Robert F. Beers; Ervin F. Johnston; Edmund W. Rusche, Jr.

[57] ABSTRACT

A sonar compensation transformer is added to a sonar transceiver circuit to obtain calibrated optimum performance from a sonar transducer using ceramic rings by slightly modifying the voltage of the transducer while at the same time allowing the transmit circuit to operate without appreciable change.

The sonar compensation transformer is an improvement upon a conventional sonar transceiver circuit containing a transformer winding connected in series with a diode switch with the outer bounding connections of the transformer winding and the diode switch connected to the transducer element while the connection to the sonar transceiver is from a connection tapped into the winding of the sonar transformer and the connection from the outer bound of the diode switch. The sonar compensation transformer is connected in with a primary winding placed in parallel with the diode switch. The secondary winding is connected in the lead from the outside connection to the diode switch to the sonar transceiver, and is positioned to inductively interact with the primary winding placed in parallel across the diode switch. Proper design and adjustment of the secondary winding of the sonar compensation transformer provides the capability to slightly modify the voltage of any input acoustical signal to the sonar transducer to balance it in relation to other voltages received through similar circuits for other sonar transducer elements.

2 Claims, 2 Drawing Figures

SONAR COMPENSATION TRANSFORMER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Modern sonar systems are built around the operation of transducers which are designed to both receive and transmit acoustical energy into the ocean environment. Typical high energy sonar transducers are composed of many individual acoustical transducer elements which are combined in arrays to maximize the power emission into an ocean environment as well as the reception of signals from the ocean environment.

Each transducer element in the array has its own characteristics for transforming acoustical energy into an electrical signal. In particular, the material of each transducer element may be characterized by a transconductance factor $g$ which will very from element to element. A particular characteristic of the performance of transducer elements is contained in the product of $g \times L$, where $L$ is the thickness of the capacitative element of the piezoelectric transducer. If $g$ were constant for the material used in all elements, the factor $g \times L$ could be maintained consistent by manufacturing all transducer elements to a common thickness $L$.

However, the effort required to ensure a consistent value for the transconductance $g$ is too extensive, and therefore it becomes necessary to accept transducer elements with varying $g \times L$ factors. An alternative to the attempt at unifying the $g \times L$ factor during the manufacture of the product is to create a compensating device to be built in the sonar circuit which can compensate for variations in this factor during the receive mode. An effective compensation method of this type must not modify the transmit mode characteristics.

SUMMARY OF THE INVENTION

The invention is a sonar compensation transformer which comprises a standard sonar transceiver circuit with a compensation transformer built into the circuit to slightly modify the voltage of the transducer during signal reception while at the same time allowing the transmit circuit to operate without appreciable change. The standard sonar circuit comprises a transformer winding in series with a diode switch. Terminals bounding the circuit feed the ceramic transducer for either driving the transducer to emit acoustical energy into the surrounding medium or for returning an electrical signal resulting from acoustical energy picked up by the transducer. Another set of terminals, one of which taps into the transformer winding, are connected with the sonar transceiver for originating the power to transmit energy and for receiving the acoustical signal picked up.

A compensation transformer is inserted in this circuit which comprises a primary winding connected in parallel with a diode switch. A secondary winding is incorporated in a common connection from the outside of the diode switch to both the sonar transducer and the sonar transceiver, and said second winding is also positioned to inductively couple with the primary winding. By proper selection of the primary and secondary winding the voltage returning from a detected acoustical signal is slightly modified to balance the characteristics of the particular transducer against those characteristics of other transducers with similar circuits.

OBJECTS OF THE INVENTION

An object of the invention is to present a sonar compensation transformer added to a sonar transceiver circuit to compensate for differences in characteristics of transducer elements.

A second object of the invention is to present a compensation transformer added to better compensate for the transconductance $g$ times the thickness $L$ of the transducer product.

A further object of the invention is to present a compensation transformer to better compensate for the $g \times L$ product during the receive mode and not to modify the transmit mode compensation.

These and other objects of the invention will become more readily apparent from the ensuing specification when taken with the appended drawings.

FIGURES OF THE INVENTION

DESCRIPTION OF THE PREFERRED EMBODIMENT

Figure 1:
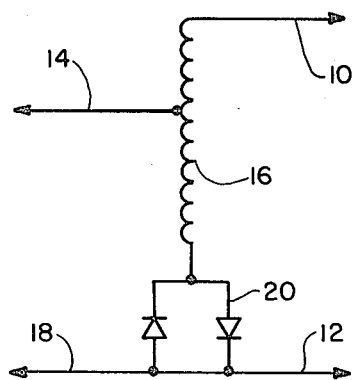
FIG. 1 is a schematic of the present circuit for the transceiver used in sonar systems.

FIG. 1 shows the present transformer circuit used in the sonar. Leads 10 and 12 connect with the sonar transducer. Leads 14 and 18 connect to the sonar transceiver. Lead 14 taps into the transformer winding 16 at a preselected point. Diode switch 20 connects between transformer winding 16 and the lead between the transceiver and sonar transducer identified as 12 and 18.

Figure 2:
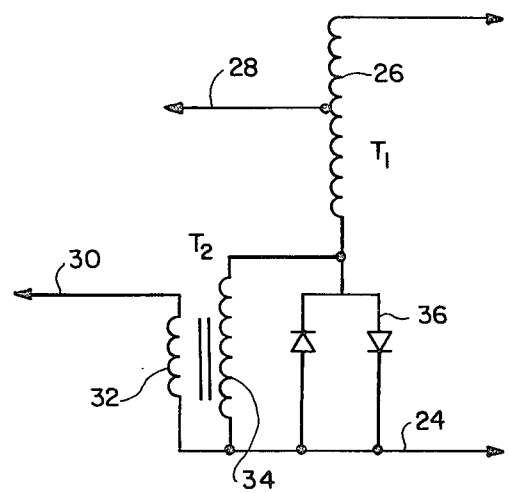
FIG. 2 shows a schematic of the transceiver circuit modified with the sonar compensation transformer of this invention.

FIG. 2 shows the modification of the present circuit to incorporate the sonar compensation transformer. Leads 22 and 24 connect to the sonar transducer element. Lead 28 taps in to the transformer winding 26 at some preselected point and connects to the transceiver. The diode switch 36 is connected between the transformer winding 26 and lead 24 which connects to the sonar transducer. Added to this circuit is a primary winding 34 of the sonar compensation transformer, and secondary winding 32 which is incorporated in lead 30 which connects to the transceiver from the base of the diode switch. The secondary winding 32 is preadjusted to compensate for variations in the $g \times L$ product of the transducer element in order to slightly adjust the voltage output during reception of acoustical signals by the transducer element. Such adjustment, transducer element by transducer element, provides a means for balancing the outputs of all transducer elements within an array of transducer elements in the sonar.

When the sonar is in the transmit mode a high voltage, high power signal is fed through leads 28 and 30 across diode switch 36 and transformer winding 26 to the transducer element. The high current and voltage of the power transmitted to the transducer element causes the diode switch to close thereby shunting out the transformer coil 34 and effectively shunting the entire current load through diode switch 36 and transformer winding 26. Consequently, the compensation transformer is effectively blocked out of the circuit and does not interfere during transmission of acoustical signals by the sonar system.

In the receive mode, low level signals come in from the transducer element via connections 22 and 24. These low level signals are generally of a magnitude less than one volt. The low level magnitude of these signals is insufficient to cause the diode switch circuit to close and thereby shunt its current through to the lead 30. As a result, with the diode switch effectively open, the current through transformer winding 26 is directed over through the sonar compensation transformer winding 34 which then inductively couples with the secondary winding 32 providing a controlled output signal to the transceiver between connections 30 and 28.

Compensation for the particular characteristics of the transducer element is thereby accomplished, and such compensation takes place without an effect created to alter the characteristics of any high level signal transmitted to energize the transducers to emit acoustical radiation during a transmit mode. In a sonar array of transducer elements, a sonar compensation transformer circuit will be associated with each transducer element. Adjustment of the sonar compensation transformer through the appropriate configuration or design of the secondary 32 provides compensation capability to uniformly balance the outputs from each transducer element. The same transducer circuit is therefore usable either as a sonar receiver or as a sonar transmitter, and usable in a manner that the circuit during transmit or receive will not affect the performance of the circuit for the other operation.

Obviously, many modifications and variations of the present invention are possible in the light of the above teachings. It is therefore to be understood that within the scope of the appended claims the invention may be practiced otherwise than as specifically described.

What is claimed is:

1. An improved sonar transceiver made up of a tapped transformer in series with a diode switch wherein the connection to the transducer is from the terminals bounding the transformer winding and series connected diode switch, and connections to the transmitter is between a preselected terminal tap into the transformer winding and the bounding terminal at the opposite end of the diode switch, said improvement comprising:
   means connected in parallel with said diode switch for inducing a controlled magnetic field dependent upon the acoustical signal received by the transducer; and
   means connected in the line to the transceiver which connects from the bounding terminal at the opposite end of the diode switch for inductively receiving the magnetic field created by the inducing means, said receiving means being preadjusted to control the output voltage of the signal from the transducer which is being transmitted to the transceiver for processing.

2. An improved sonar transceiver made up of a tapped transformer in series with diode switch wherein the connection to the transducer is from the terminals bounding the transformer winding and series connected diode switch, and connection to the transmitter is between a preselected terminal tap into the transformer winding and the bounding terminal at the opposite end of the diode switch, said improvement comprising:
   a primary transformer winding connected in parallel with the diode switch; and
   a secondary transformer winding of predetermined characteristics connected in the line to the transceiver which connects from the bounding terminal at the opposite end of the diode switch, said secondary winding positioned to inductively pick up the signal from said primary winding.

* * * * *